United States Patent [19]

Hayashida

[11] 4,116,493
[45] Sep. 26, 1978

[54] BRAKE PRESSURE CONTROL VALVE
[75] Inventor: Yoshihiro Hayashida, Chigasaki, Japan
[73] Assignee: Tokico Ltd., Japan
[21] Appl. No.: 850,489
[22] Filed: Nov. 10, 1977
[30] Foreign Application Priority Data
Nov. 16, 1976 [JP] Japan .......................... 51-154041[U]
[51] Int. Cl.$^2$ ............................................. B60T 8/14
[52] U.S. Cl. ................................. 303/24 A; 303/24 F
[58] Field of Search ................... 303/6 C, 22 R, 24 R, 303/24 A, 24 C, 24 F; 188/349, 195, 352

[56] References Cited
U.S. PATENT DOCUMENTS
3,771,835  11/1973  Yabuta ............................... 303/24 C FOREIGN PATENT DOCUMENTS
1,321,921  7/1973  United Kingdom ................. 303/24 A Primary Examiner—Trygve M. Blix
Assistant Examiner—Reinhard J. Eisenzopf

[57] ABSTRACT

A brake pressure control valve including an inertia member being movable in response to the inertia force acting on the member, particularly when the rate of deceleration caused by braking action exceeds a predetermined amount, so as to close a fluid passage for controlling braking pressure, in which a stop member is mounted in a housing of the pressure control valve and being operable manually from the outside of the valve so as to abut with the inertia member for preventing the fluid passage from being closed by the inertia member.

4 Claims, 3 Drawing Figures

BRAKE PRESSURE CONTROL VALVE

BACKGROUND OF THE INVENTION

This invention relates to improvement in a brake pressure control valve for use in a vehicle.

Various types of brakes utilizing hydraulic pressure are used in vehicles but, in such brakes, when hydraulic pressure generated by a brake pedal depressed by a driver is transmitted equally to the front and rear wheel brakes, the rear wheels will skid substantially prior to the point at which the front wheels begin to skid. This condition is very dangerous since it will sometimes cause so-called fish-tailing of the vehicle.

In preventing such shortcomings caused by change in the weight distribution of the vehicle between the static condition and the rapidly decelerated condition, hydraulic pressure control valves of the type utilizing an inertia valve which actuates in response to the inertia force acting on applying brake have been interposed between the master cylinder and rear wheel brake cylinders to reduce hydraulic pressure transmitted to the rear wheel brake cylinders with respect to the front wheel brake cylinders.

While, in the hydraulic pressure control valve of the aforementioned type, it has sometimes been experienced that it is very difficult to bleed or to expel any included air from hydraulic braking system incorporating the control valve completely since the inertia valve will tend to close under the influence of high speed liquid flow flowing through the system in the bleeding operation.

BRIEF SUMMARY OF THE INVENTION

An object of the present invention is to solve aforesaid problems by providing a stop which acts to hold the inertia valve in its open condition during the bleeding operation.

Some embodiments of the present invention will now be explained with reference to the accompanying drawings.

DETAILED DESCRIPTION OF THE PREFERRED EMBODIMENTS

Figure 1:
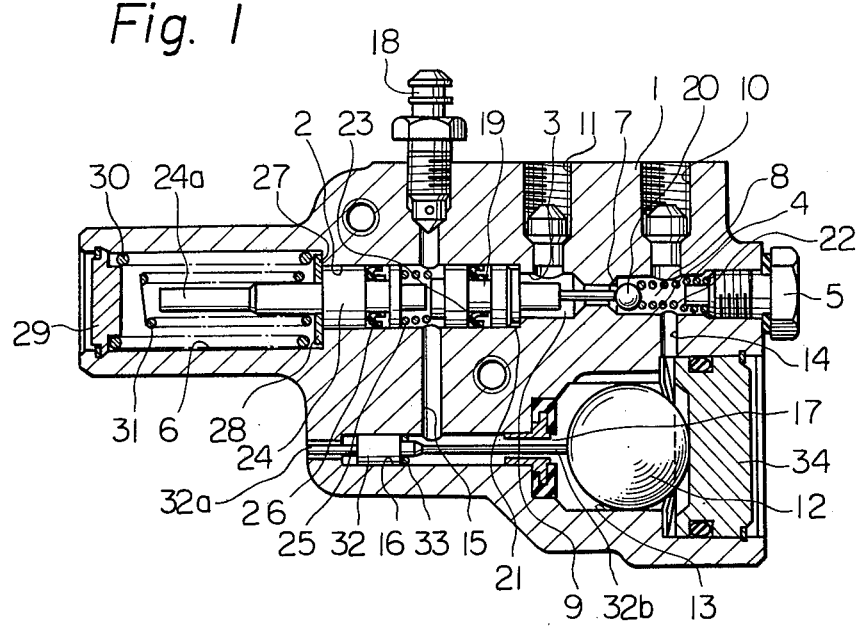
FIG. 1 is a cross-sectional view of a brake pressure control valve according to the present invention.

Referring especially to FIG. 1, a housing 1 of a brake pressure control valve is provided with a large diameter bore 2, a reduced diameter bore 3 and a further reduced diameter bore 4 arranged along a straight line extending from the left side of the housing as viewed in the drawing and communicating with one another. A plug 5 closes the open end of the bore 4. A bore 6 communicating with the bore 2 is formed in the housing 1.

A valve seat 7 is formed between the bores 3 and 4, and a first and a second pressure chambers 8 and 9 are defined respectively in the bores 4 and 3. An inlet port 10 connected to a master cylinder (not shown) is formed in the first pressure chamber 8, and a outlet port 11 for connecting with rear wheel brake cylinders (not shown) is formed in the second pressure chamber 9. Thus, the inlet port 10, the first pressure chamber 8, the second pressure chamber 9 and the outlet port 11 form a braking fluid passage.

An inertia valve 12 in the form of a ball for responding with the inertia of the vehicle is arranged in an inertia valve chamber 13 formed in the housing 1, and the chamber 13 communicates with the first pressure chamber 8 through a passage 14 and with the bore 2 through a bore 16 and a passage 15. A valve seat 17 is formed in the chamber 13 on the side of the bore 16. When the brakes are applied and the deceleration of the vehicle reaches at a predetermined rate, the inertia valve 12 rolls leftward in the drawing to engage with the valve seat 17 thereby intercepts a brake pressure controlling passage consisting of the passage 14, the chamber 13, the bore 16 the passage 15 and the bore 2. Usually the housing 1 is installed on the vehicle at an inclined attitude such that the leftside of the inertia valve chamber 13 is higher than the rightside thereof as viewed in the drawing. Shown at 18 is a bleed screw for expelling air from the bore 2.

A first piston 19 is slidably fitted in the bore 2 with the tip end or the rightside end thereof abutting normally with a ball valve 20 disposed in the first pressure chamber 8. When the first piston 19 moves leftward in the drawing the ball valve 20 will engage with the valve seat 7 to intercept fluid flow through the braking fluid passage. The rightward movement of the first piston 19 is restricted by a shoulder portion 21 formed between the bores 2 and 3, and the ball valve 20 is urged toward the valve seat 7 by a spring 22 disposed in the first pressure chamber 8. The opposite ends of the first piston 19 are separated fluid-tightly by a seal ring 23.

A second piston 24 is also fitted slidably and sealingly in the bore 2, and a spring 25 is interposed between the first and the second pistons 19, 24. The spring force of the spring 25 is stronger than that of the spring 22. The piston 24 has a stem portion 24a extending into the bore 6. A washer 28 abuts normally against a shoulder portion 27 defined between the bores 2 and 6, and a spring 30 acts between the washer 27 and a plug 29 closing the open end of the bore 6. A spring 31 is disposed to surround the stem portion 24a normally at its free length condition.

Figure 2:
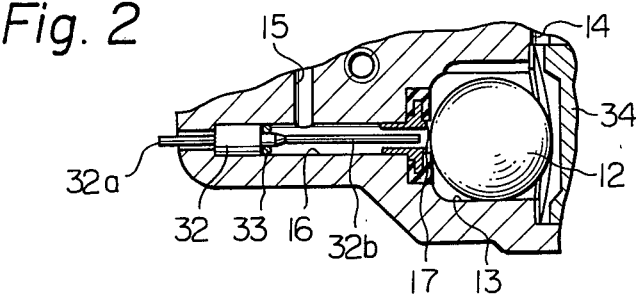
FIG. 2 is a partial cross-sectional view of the pressure control valve wherein the stop takes a position separating from the inertia member.

According to the present invention there provided a stop member 32 in the bore 16 movably towards and away from the inertia valve 12. The outer 32a of the stop member 32 projects normally outwards of the housing 1 as shown in FIG. 2. When the stop member 32 is moved toward the inertia valve 12 as shown in FIG. 1, the inner end 32b of the stop member 32 will abut with the inertia 12 to prevent the inertia valve 12 from seating with the valve seat 17. In air-bleeding operation, the stop member 32 is held to the position shown in FIG. 1, but the stop member 32 is normally urged to the position shown in FIG. 2 by hydraulic pressure acting in the bore 16. Shown at 33 is a seal ring. Incidentally, the stop member 32 does not close the passage 15 even in its innermost position.

The brake pressure control valve according to the present invention having the construction as described above operates as follows:

In the inactuated condition, the inertia valve 12 abuts with a plug 34 of the inertia valve chamber 13, thus, the passage 14 is communicated with the passage 15, and since the ball valve 20 is separated from the valve seat 7 the first pressure chamber 8 communicates with the second pressure chamber 9.

Assuming that a driver of the vehicle depresses a brake pedal at that condition, hydraulic fluid from the master cylinder flows into a first circuit consisting of the inlet port 10, first pressure chamber 8, second pressure chamber 9 and the outlet port 11, and a second circuit consisting of the inlet port 10, first pressure chamber 8, the passage 14, the inertia valve chamber 13, the bore 16, the passage 15 and the bore 2 between the first and the second pistons 19, 24. The fluid from the outlet port 11 flows into the rear wheel brake cylinders to apply brake on the rear wheels. The front wheel brake cylinders are connected directly to the master cylinder. When deceleration of the vehicle increases to a predetermined rate, the inertia valve 12 rolls by its inertia toward the valve seat 17 to close the second circuit or the brake pressure controlling passage. Thus, the first piston 19 and the second piston 24 will act as a unit by the brake fluid enclosed in the bore 2, the passage 15 and the bore 16. The hydraulic pressure in the second pressure chamber 9 acts to move the first and second pistons 19, 24 unitary against the spring 30. Accordingly, the ball valve 20 will seat on the valve seat 7 to cut off the first circuit or the braking fluid passage. Thereafter, the fluid pressure applied on the rear wheel brake cylinders is maintained at a constant value.

When the vehicle is in the light loaded condition the predetermined deceleration for closing the inertia valve 12 will be established by a relatively low braking pressure so that only the spring 30 acts. But when the vehicle is in the heavy loaded condition the pressure in the bore 2 is so high, when the inertia valve 12 seats on the valve seat 17, that the second piston 24 moves leftward against the spring force of the springs 30 and 31. Thereafter, in response to the increase of the pressure in the pressure chamber 9 the piston 19 and 24 move as a unit in the leftward direction in the drawing to seat the ball valve 20 with the valve seat 7 and, braking pressure applied on the rear wheel brake cylinder is maintained at a constant value.

Now, description will be given with respect to air-bleeding operation. When the outer end 32a of the stop member 32 is pushed inwardly of the housing 1, the inner end 32b of the stop member 32 will abut with the inertia valve 12 to hold the valve 12 in its open position. Air-bleeding is effected by loosening the bleed screw 18 and flowing brake fluid in the brake pressure controlling passage to remove any included air from the passage. When air is removed from the passage completely, the bleed screw 18 is tightened and the force applied on the outer end of the stop member 32 is released, then, the stop member 32 moves outward according to hydraulic pressure prevailing in the control valve to the position where the inner end 32b of the stop member 32 will not engage with the inertia valve 12.

Figure 3:
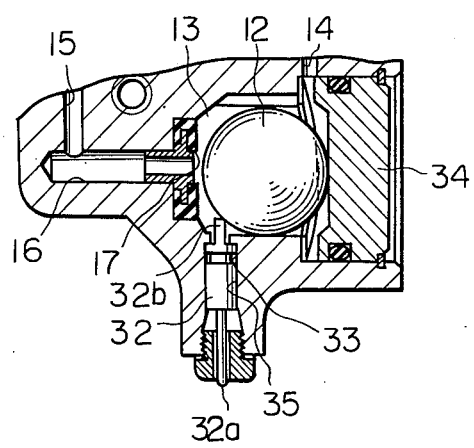
FIG. 3 is a partial cross-sectional view of another embodiment of the present invention.

Another embodiment of the present invention is shown in FIG. 3, in which, the stop member 32 is incorporated in a bore 35 which opens into the inertia valve chamber 13 separately from the bore 16.

In the embodiments, the stop member 32 moves outward in receiving hydraulic pressure, but it is possible to arrange a spring or the like acting on the stop member 32 for urging it away from the inertia valve 12.

In the embodiments, the inertia valve 12 is disposed in the braking pressure controlling passage, but the present invention may also be applied to brake pressure control valve of the type having an inertia valve mounted in the braking fluid passage as shown in U.S. Pat. No. 3,317,251 or the like.

As described heretofore in detail, the pressure control valve according to the invention comprises a stop member operable from the outside of the control valve to hold the inertia valve in its open position in air-bleeding operation, thus, the inertia valve will not be moved to its valve closing position by the fluid flow and air-bleeding operation can be performed sufficiently. Air included in braking system can be removed completely, thus, it is possible to operate the braking system satisfactorily.

What is claimed is:

1. A brake pressure control valve including an inertia member being movable in response to the inertia force acting on said member, particularly when the rate of deceleration caused by braking action exceeds a predetermined amount, so as to close a fluid passage for controlling hydraulic braking pressure being supplied through said valve, in which a stop member is mounted in a housing of said valve and being operable manually from the outside of the housing so as to abut with the inertia member for preventing said fluid passage from being closed by said inertia member.

2. A brake pressure control valve as set forth in claim 1 in which the stop member is slidably and sealingly received in a bore of the housing with one end projecting normally to the outside of the housing and the other end of which being adapted to abut with the inertia member for restricting the movement thereof when said one end is pushed inwards of the housing.

3. A brake pressure control valve as set forth in claim 2 in which a valve seat for cooperating with the inertia member is defined on the inner end of said bore, and said stop member has a reduced diameter portion extending longitudinally and loosely in the bore and defining said other end on the tip end thereof.

4. A brake pressure control valve as set forth in claim 2 in which said bore receiving the stop member therein extends transversely relative to the direction of the movement of said inertia member, and the inertia member is in the form of a ball.

* * * * *